(12) United States Patent
Solis

(10) Patent No.: US 9,930,146 B2
(45) Date of Patent: Mar. 27, 2018

(54) SYSTEM AND METHOD FOR COMPRESSING CONTENT CENTRIC NETWORKING MESSAGES

(71) Applicant: CISCO TECHNOLOGY, INC., San Jose, CA (US)

(72) Inventor: Ignacio Solis, Scotts Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 165 days.

(21) Appl. No.: 15/090,248

(22) Filed: Apr. 4, 2016

(65) Prior Publication Data
US 2017/0289316 A1   Oct. 5, 2017

(51) Int. Cl.
| | |
|---|---|
| G06F 15/16 | (2006.01) |
| H04L 29/06 | (2006.01) |
| H04L 12/741 | (2013.01) |
| H04L 29/08 | (2006.01) |
| H04L 12/70 | (2013.01) |

(52) U.S. Cl.
CPC ............. *H04L 69/04* (2013.01); *H04L 29/06* (2013.01); *H04L 29/08072* (2013.01); *H04L 45/745* (2013.01); *H04L 67/2842* (2013.01); *H04L 67/327* (2013.01); *H04L 69/22* (2013.01); *H04L 2012/5652* (2013.01)

(58) Field of Classification Search
CPC ... H04L 12/4633; H04L 69/22; H04L 27/265; H04L 29/08072; H04L 29/06
USPC .................. 709/220, 247, 231; 707/623, 653
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Khanh Dinh

(57) ABSTRACT

A computer system can compress or decompress a type-length-value (TLV) component in a message. During operation, the computer can select a compression table associated with a network interface used to send and/or to receive the message, and can search the compression table for an entry that includes a prefix of a value from type-length-value (TLV) component being compressed or decompressed. If compressing the message, the computer may generate a compressed block that corresponds to a compressed version of the TLV component, such that the compressed block includes the compression encoding in place of the prefix in the TLV component's value. The computer can also generate a compressed message that includes the compressed block in place of the TLV component, without a compression table.

18 Claims, 11 Drawing Sheets

(56) References Cited

U.S. PATENT DOCUMENTS

| | | |
|---|---|---|
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,037,035 B2 * | 10/2011 | Kataoka ............ G06F 17/3053 707/623 |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,326,810 B2 * | 12/2012 | Faerber ............... H03M 7/3084 707/693 |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,497,788 B1 * | 7/2013 | Miller ..................... H03M 7/30 341/51 |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |

(56) References Cited

U.S. PATENT DOCUMENTS

| | | | |
|---|---|---|---|
| 8,972,969 B2 | 3/2015 | Gaither | |
| 8,977,596 B2 | 3/2015 | Montulli | |
| 9,002,921 B2 | 4/2015 | Westphal | |
| 9,032,095 B1 | 5/2015 | Traina | |
| 9,071,498 B2 | 6/2015 | Beser | |
| 9,112,895 B1 | 8/2015 | Lin | |
| 9,137,152 B2 | 9/2015 | Xie | |
| 9,253,087 B2 | 2/2016 | Zhang | |
| 9,270,598 B1 | 2/2016 | Oran | |
| 9,280,610 B2 | 3/2016 | Gruber | |
| 9,503,229 B2 * | 11/2016 | Bae | H04L 5/0007 |
| 2002/0002680 A1 | 1/2002 | Carbajal | |
| 2002/0010795 A1 | 1/2002 | Brown | |
| 2002/0038296 A1 | 3/2002 | Margolus | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0152305 A1 | 10/2002 | Jackson | |
| 2002/0176404 A1 | 11/2002 | Girard | |
| 2002/0188605 A1 | 12/2002 | Adya | |
| 2002/0199014 A1 | 12/2002 | Yang | |
| 2003/0004621 A1 | 1/2003 | Bousquet | |
| 2003/0009365 A1 | 1/2003 | Tynan | |
| 2003/0033394 A1 | 2/2003 | Stine | |
| 2003/0046396 A1 | 3/2003 | Richter | |
| 2003/0046421 A1 | 3/2003 | Horvitz et al. | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0061384 A1 | 3/2003 | Nakatani | |
| 2003/0074472 A1 | 4/2003 | Lucco | |
| 2003/0088696 A1 | 5/2003 | McCanne | |
| 2003/0097447 A1 | 5/2003 | Johnston | |
| 2003/0099237 A1 | 5/2003 | Mitra | |
| 2003/0140257 A1 | 7/2003 | Peterka | |
| 2003/0229892 A1 | 12/2003 | Sardera | |
| 2004/0024879 A1 | 2/2004 | Dingman | |
| 2004/0030602 A1 | 2/2004 | Rosenquist | |
| 2004/0064737 A1 | 4/2004 | Milliken | |
| 2004/0071140 A1 | 4/2004 | Jason | |
| 2004/0073617 A1 | 4/2004 | Milliken | |
| 2004/0073715 A1 | 4/2004 | Folkes | |
| 2004/0139230 A1 | 7/2004 | Kim | |
| 2004/0196783 A1 | 10/2004 | Shinomiya | |
| 2004/0218548 A1 | 11/2004 | Kennedy | |
| 2004/0221047 A1 | 11/2004 | Grover | |
| 2004/0225627 A1 | 11/2004 | Botros | |
| 2004/0233916 A1 | 11/2004 | Takeuchi | |
| 2004/0246902 A1 | 12/2004 | Weinstein | |
| 2004/0252683 A1 | 12/2004 | Kennedy | |
| 2004/0267902 A1 | 12/2004 | Yang | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0066121 A1 | 3/2005 | Keeler | |
| 2005/0074001 A1 | 4/2005 | Mattes | |
| 2005/0132207 A1 | 6/2005 | Mourad | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0281288 A1 | 12/2005 | Banerjee | |
| 2005/0286535 A1 | 12/2005 | Shrum | |
| 2005/0289222 A1 | 12/2005 | Sahim | |
| 2006/0010249 A1 | 1/2006 | Sabesan | |
| 2006/0029102 A1 | 2/2006 | Abe | |
| 2006/0039379 A1 | 2/2006 | Abe | |
| 2006/0051055 A1 | 3/2006 | Ohkawa | |
| 2006/0072523 A1 | 4/2006 | Richardson | |
| 2006/0099973 A1 | 5/2006 | Nair | |
| 2006/0129514 A1 | 6/2006 | Watanabe | |
| 2006/0133343 A1 | 6/2006 | Huang | |
| 2006/0146686 A1 | 7/2006 | Kim | |
| 2006/0173831 A1 | 8/2006 | Basso | |
| 2006/0193295 A1 | 8/2006 | White | |
| 2006/0203804 A1 | 9/2006 | Whitmore | |
| 2006/0206445 A1 | 9/2006 | Andreoli | |
| 2006/0215684 A1 | 9/2006 | Capone | |
| 2006/0223504 A1 | 10/2006 | Ishak | |
| 2006/0242155 A1 | 10/2006 | Moore | |
| 2006/0256767 A1 | 11/2006 | Suzuki | |
| 2006/0268792 A1 | 11/2006 | Belcea | |
| 2006/0288237 A1 | 12/2006 | Goodwill | |
| 2007/0019619 A1 | 1/2007 | Foster | |
| 2007/0073888 A1 | 3/2007 | Madhok | |
| 2007/0094265 A1 | 4/2007 | Korkus | |
| 2007/0112880 A1 | 5/2007 | Yang | |
| 2007/0124412 A1 | 5/2007 | Narayanaswami | |
| 2007/0127457 A1 | 6/2007 | Mirtorabi | |
| 2007/0156998 A1 | 7/2007 | Gorobets | |
| 2007/0160062 A1 | 7/2007 | Morishita | |
| 2007/0162394 A1 | 7/2007 | Zager | |
| 2007/0171828 A1 | 7/2007 | Dalal | |
| 2007/0189284 A1 | 8/2007 | Kecskemeti | |
| 2007/0195765 A1 | 8/2007 | Heissenbuttel | |
| 2007/0204011 A1 | 8/2007 | Shaver | |
| 2007/0209067 A1 | 9/2007 | Fogel | |
| 2007/0239892 A1 | 10/2007 | Ott | |
| 2007/0240207 A1 | 10/2007 | Belakhdar | |
| 2007/0245034 A1 | 10/2007 | Retana | |
| 2007/0253418 A1 | 11/2007 | Shiri | |
| 2007/0255677 A1 | 11/2007 | Alexander | |
| 2007/0255699 A1 | 11/2007 | Sreenivas | |
| 2007/0255781 A1 | 11/2007 | Li | |
| 2007/0274504 A1 | 11/2007 | Maes | |
| 2007/0275701 A1 | 11/2007 | Jonker | |
| 2007/0276907 A1 | 11/2007 | Maes | |
| 2007/0283158 A1 | 12/2007 | Danseglio | |
| 2007/0294187 A1 | 12/2007 | Scherrer | |
| 2008/0005056 A1 | 1/2008 | Stelzig | |
| 2008/0005223 A1 | 1/2008 | Flake | |
| 2008/0010366 A1 | 1/2008 | Duggan | |
| 2008/0037420 A1 | 2/2008 | Tang | |
| 2008/0043989 A1 | 2/2008 | Furutono | |
| 2008/0046340 A1 | 2/2008 | Brown | |
| 2008/0059631 A1 | 3/2008 | Bergstrom | |
| 2008/0080440 A1 | 4/2008 | Yarvis | |
| 2008/0082662 A1 | 4/2008 | Dandliker | |
| 2008/0095159 A1 | 4/2008 | Suzuki | |
| 2008/0101357 A1 | 5/2008 | Iovanna | |
| 2008/0107034 A1 | 5/2008 | Jetcheva | |
| 2008/0107259 A1 | 5/2008 | Satou | |
| 2008/0123862 A1 | 5/2008 | Rowley | |
| 2008/0133583 A1 | 6/2008 | Artan | |
| 2008/0133755 A1 | 6/2008 | Pollack | |
| 2008/0151755 A1 | 6/2008 | Nishioka | |
| 2008/0159271 A1 | 7/2008 | Kutt | |
| 2008/0165775 A1 | 7/2008 | Das | |
| 2008/0186901 A1 | 8/2008 | Itagaki | |
| 2008/0200153 A1 | 8/2008 | Fitzpatrick | |
| 2008/0215669 A1 | 9/2008 | Gaddy | |
| 2008/0216086 A1 | 9/2008 | Tanaka | |
| 2008/0243992 A1 | 10/2008 | Jardetzky | |
| 2008/0250006 A1 | 10/2008 | Dettinger | |
| 2008/0256138 A1 | 10/2008 | Sim-Tang | |
| 2008/0256359 A1 | 10/2008 | Kahn | |
| 2008/0270618 A1 | 10/2008 | Rosenberg | |
| 2008/0271143 A1 | 10/2008 | Stephens | |
| 2008/0287142 A1 | 11/2008 | Keighran | |
| 2008/0288580 A1 | 11/2008 | Wang | |
| 2008/0291923 A1 | 11/2008 | Back | |
| 2008/0298376 A1 | 12/2008 | Takeda | |
| 2008/0320148 A1 | 12/2008 | Capuozzo | |
| 2009/0006659 A1 | 1/2009 | Collins | |
| 2009/0013324 A1 | 1/2009 | Gobara | |
| 2009/0022154 A1 | 1/2009 | Kiribe | |
| 2009/0024641 A1 | 1/2009 | Quigley | |
| 2009/0030978 A1 | 1/2009 | Johnson | |
| 2009/0037763 A1 | 2/2009 | Adhya | |

(56) References Cited

U.S. PATENT DOCUMENTS

| | | |
|---|---|---|
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |

(56) References Cited

U.S. PATENT DOCUMENTS

| | | |
|---|---|---|
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2016/0197826 A1* | 7/2016 | Yang ............... H04L 69/22 370/392 |
| 2017/0005761 A1* | 1/2017 | Oh ............... H04L 5/0007 |
| 2017/0026140 A1* | 1/2017 | Bae ............... H04L 5/0007 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |

(56) References Cited

FOREIGN PATENT DOCUMENTS

| | | |
|---|---|---|
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks. Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/, downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

(56) References Cited

OTHER PUBLICATIONS

Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).

V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.

(56) References Cited

OTHER PUBLICATIONS

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazine, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.

(56) References Cited

OTHER PUBLICATIONS

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, Paragraph [002] figure 1.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] paragraphs [003]-[006], [0011], [0013] figures 1,2.
Marc Mosko et al "All-In-One Streams for Content Centric Networks", May 24, 2015, retrieved from the Internet: http://www.ccnx.org/pubs/AllinOne.pdf [downloaded Jun. 9, 2016] the whole document.
Cesar Ghali et al. "Elements of Trust in Named-Data Networking", Feb. 13, 2014 Retrieved from the internet Jun. 17, 2016 http://arxiv.org/pdf/1402.3332v5.pdf p. 5, col. 1 p. 2, col. 1-2 Section 4.1; p. 4, col. 2 Section 4.2; p. 4, col. 2.
Priya Mahadevan et al. "CCN-KRS", Proceedings of the 1st International Conference on Information-Centric Networking, Inc. '14, Sep. 24, 2014.
Flavio Roberto Santos et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al. "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al. "Server-Supported Signatures", Computer Security Esorics 96, Sep. 25, 1996, pp. 131-143, Section 3.
Mandl et al. "A Fast FPGA Based Coprocessor Supporting Hard Real-Time Search", New Frontiers of Information Technology, Proceedings of the 23rd Euromicro Conference Budapest, Sep. 1, 1997, pp. 499-506 The Whole Document.
Sun et al. "Content-Based Route Lookup Using CAMs", Global Communications Conference, IEEE, Dec. 3, 2012 The Whole Document.
Gelenbe et al. "Networks With Cognitive Packets", Modeling, Analysis and Simulation of Computer and Telecommunication Systems, 2000. IEEE, Aug. 29, 2000, pp. 3-10.
Vangelis et al. "On the Role of Semantic Descriptions for Adaptable Protocol Stacks in the Internet of Things", 2014 28th International Conference on Advanced Information Networking and Applications Workshops, IEEE, May 13, 2014, pp. 437-443, last paragraph of section II.B.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.

\* cited by examiner

SYSTEM AND METHOD FOR COMPRESSING CONTENT CENTRIC NETWORKING MESSAGES

BACKGROUND

Field

This disclosure is generally related to a content centric network (CCN). More specifically, this disclosure is related to compressing and decompressing CCN messages.

Related Art

The proliferation of the Internet and e-commerce continues to fuel revolutionary changes in the network industry. Today, a significant number of information exchanges, from online movie streaming to daily news delivery, retail sales, and instant messaging, are conducted online. An increasing number of Internet applications are also becoming mobile. However, the current Internet operates on a largely location-based addressing scheme. The most ubiquitous protocol, the Internet Protocol (IP), is based on location-based address. That is, a consumer of content can only receive the content by explicitly requesting the content from an address (e.g., IP address) closely associated with a physical object or location. A request that has a URL with an IP address for a specific organization causes the request to go to that organization's servers and not to those of another organization.

Recently, content centric networking (CCN) architectures have been proposed in the industry. CCN brings a new approach to content transport. Instead of having network traffic viewed at the application level as end-to-end connections over which content travels, content is requested or returned based on its unique location-independent name, and the network is responsible for routing content from the provider to the consumer.

With content centric networks, there are generally two types of CCN messages: Interests and Content Objects. An Interest message includes a name for a Content Object, and a client can disseminate the Interest over CCN to obtain the Content Object from any CCN node that hosts the Content Object. The Interest is forwarded toward a CCN node that advertises at least a prefix of the Interest's name. If this CCN node can provide the Content Object, this node can return the Content Object (along the Interest's reverse path) to satisfy the Interest.

There's multiple ways to compress messages. One approach may be to use a general compression algorithm, such as the "zip" compression algorithm, to compress portions of a message. The zip algorithm would create a compression table of common bit patterns, and specifies a sequence in which these patterns occur within the file. However, such compression algorithms include the compression table within the compressed file. If two computers frequently exchange data with similar segments, the two computers may frequently exchange compression tables that are substantially similar, which can result in redundant data transfers.

SUMMARY

One embodiment provides a computer system that can compress a type-length-value (TLV) component in a message. During operation, the computer can select, from a message, a TLV component to compress. The computer can search a compression table for an entry that includes a prefix of the TLV component's value, and obtains a compression encoding for the TLV value from the compression table entry. The computer may then generate a compressed block that corresponds to a compressed version of the TLV component, such that the compressed block includes the compression encoding in place of the prefix in the TLV component's value. The computer can also generate a compressed message that includes the compressed block in place of the TLV component.

In some embodiments, the message can include an information-centric networking (ICN) message or a content-centric networking (CCN) message.

In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. CCN or Named-data network (NDN) are examples of ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in an CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, the computer can determine an interface for forwarding the CCN message, based on the CCN message's name, and selects the compression table that corresponds to the interface.

In some embodiments, once the computer generates the compressed message, the computer can forward the compressed message via the interface.

In some embodiments, while generating the compressed block, if the computer determines that the compression encoding corresponds to a subset of the TLV's value, the computer can set a continuation field of the compressed block to indicate that additional data follows the compressed block.

In some embodiments, if the computer determines that a suffix of the TLV component's value does not have a matching entry in the compression table, the computer determines a size of the suffix. The computer also appends, to the end of the compressed block, a size field that includes the suffix's size, and appends the suffix to the size field.

In some embodiments, if the computer determines that a sequence of characters following the TLV component's value have a matching entry in the compression table, the computer appends, to the compressed block, a size field with a zero value. The computer also appends, to the size field, one or more additional compressed blocks that compress a remaining portion of the TLV component's value.

One embodiment provides a computer system that can decompress a TLV component in a message.

During operation, the computer can receive a compressed message via a network interface. The computer can select a compression table associated with the interface, and can decompress a message portion from a respective compressed block of the compressed message, using the compression table. If the computer determines that the respective compressed block corresponds to a TLV component, the computer may compute a length of the message portion, and recreates the TLV component using the message portion and the computed length. The computer may then generate a decompressed message, which includes the TLV component in place of the compressed block.

In some embodiments, the computer can synchronize entries of the compression table with a computer node accessible via the interface.

In some embodiments, while decompressing the message portion from the respective compressed block, if the computer detects that a continuation field of the compressed block indicates that additional data follows the compressed block, and the computer reads a size field following the compressed block in the compressed message.

In some embodiments, if the computer determines that the size field includes a non-zero value, the computer reads a number of bytes that follow the compressed block, corresponding to the size to obtain a data suffix, and appends the data suffix to the message portion.

In some embodiments, if the computer determines that the size field includes a zero value, the computer may decompress a second compressed block that follows the respective compressed block in the compressed message, to obtain a second message portion, and appends the second message portion to the message portion.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a computer system that can compress CCN messages in a way that facilitates deduping value prefixes of Type-Length-Value (TLV) components in the message. For example, if CCN messages transmitted over a computer network typically correspond to a common set of name prefixes, the computer may replace these name prefixes with their corresponding codes in a compression table. The compressed CCN message may include the TLV's value in compressed form, and in some embodiments, may omit the TLV's length and the compression table. The recipient of the compressed CCN message can use a local compression table to decompress the TLV's value (and any other compressed sections of the CCN message), and can compute the TLV's length from the TLV's value to recreate the TLV component.

Figure 1:
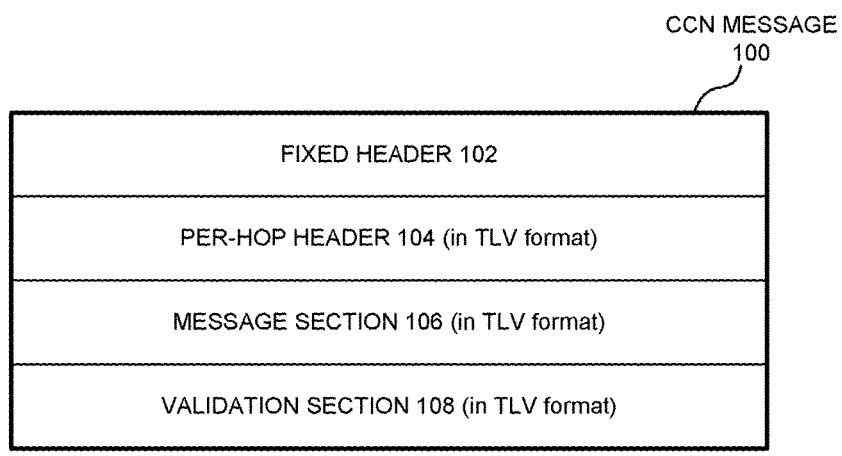
FIG. 1 illustrates an exemplary CCN message in accordance with an embodiment.

A CCN message can include several TLV structures, such that each TLV can include a type, a length, and a value. FIG. 1 illustrates an exemplary CCN message 100 in accordance with an embodiment. For example, CCN message 100 can correspond to an Interest message that includes a location-independent name for content, or can correspond to a Content Object that includes the location-independent name as well as the corresponding content. Specifically, CCN message 100 can include a fixed header 102, a per-hop header 104, a message section 106, and a validation section 108. In some embodiments, per-hop header 104, message section 106, and/or validation section 108 can be structured in a TLV format.

Figure 2:
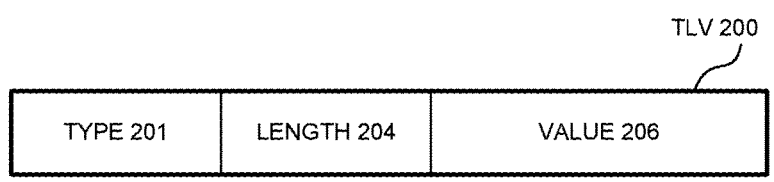
FIG. 2 an exemplary TLV in accordance with an embodiment.

FIG. 2 an exemplary TLV 200 in accordance with an embodiment. TLV 200 can include a "type" field 202, a "length" field 204, and a "value" field 206. Type field 202 can specify a type for the data stored in value field 206, and length field 204 can specify a length (e.g., a number of bytes) for the data stored in value field 206.

For example, a TLV for the name "Ignacio" may include the type "name," the length 7, and the value "Ignacio."

TABLE 1

| Type | Length | Value |
|------|--------|-------|
| Name | 7 | Ignacio |

A computer can implement a data-compression module that can processes a data block, which may include one or more TLVs, to create a compression table of common bit patterns. The computer's compression module can generate a compressed file that can specify a sequence in which these patterns occur within the file. The compression table may appear as follows:

TABLE 2

| Data | Encoding |
|------|----------|
| Ignacio | 1 |
| Type Name | 01 |
| Value 7 | 001 |

Given the compression table listed in Table 2, the compression module may compress the TLV listed in Table 1 using the binary encoding:

"010011"     (1)

The compression table listed in Table 2 can be used by the local computer, or another computer, to decompress the binary encoding (1) into the original TLV listed in Table 1. Oftentimes, decompression is performed in a self-contained way, where a compressed packet includes both the compression table and the compressed binary encoding. In embodiments of the present invention, two neighboring computers of a network topology can agree on a compression table (e.g., by synchronizing and/or negotiating changes to their shared compression table) ahead of time. Then, the computer that receives a compressed CCN message can use the local compression table to decompress the message, which prevents network nodes having to send a compression table each time they need to send compressed CCN messages over the computer network.

Figure 3:
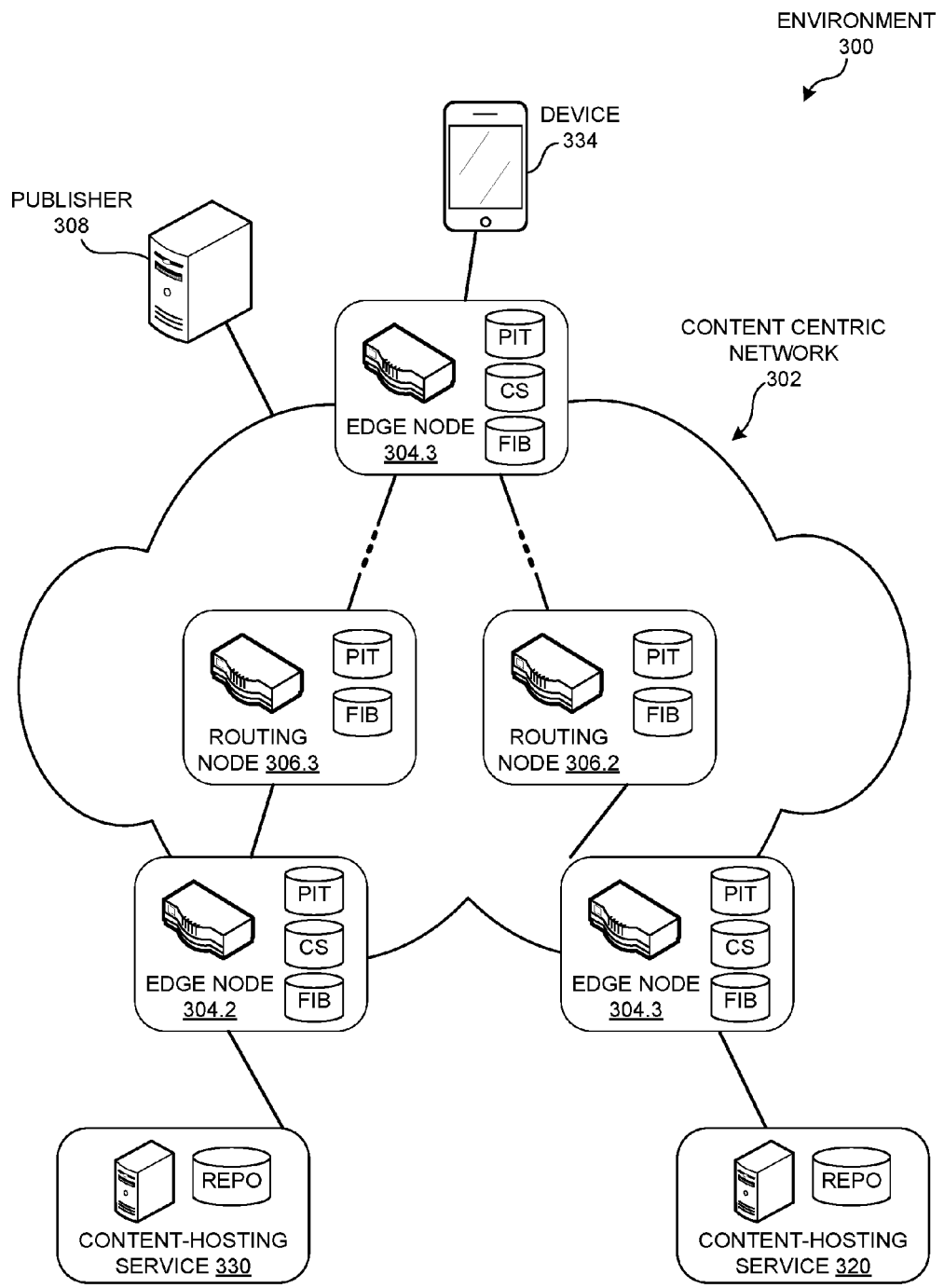
FIG. 3 illustrates an exemplary computer environment that allows a CCN network node to use a local compression table to decompress a CCN message from a neighboring CCN node in accordance with an embodiment.

FIG. 3 illustrates an exemplary computer environment that allows CCN network nodes to use a local compression table to compress or decompress a CCN message in accordance with an embodiment. For example, computing environment 300 can include a content centric network 302, which includes a plurality of edge nodes 304 and routing nodes 106 that can forward Interests based on their name or name prefix. Also, edge nodes 304 and routing nodes 306 can return Content Objects, which satisfy the Interest, based on the Content Object's name (for named Content Objects) or based on the Content Object's hash (for nameless Content Objects). A client device 334 can disseminate a compressed message that includes an Interest over CCN 302, without having to include the compression table in the compressed message. This reduces the amount of data that needs to be transmitted over CCN 302 by replacing a common TLV (or TLV segment) with a corresponding code that is shared by CCN nodes within a network neighborhood.

In some embodiments, the CCN edge nodes and routing nodes can decompress the corresponding TLVs they need for forwarding the message, such as a per-hop header stored in TLV format. A content producer or hosting service (e.g., content-hosting services 320 and 330) can decompress the full message to obtain the Interest, and can compress a Content Object that satisfies the Interest before returning the Content Object via CCN. Once client device 334 receives the Content Object, client device 334 can decompress the full Content Object to validate the Content Object (e.g., using a validation section expressed in TLV format), and to obtain the Content Object's payload (e.g., a message section expressed in TLV format).

In some embodiments, a client can disseminate a series of Interests for multiple chunks that make up a file, using an Interest name:

"/parc/file/c=n"     (2)

In Interest (2), the portion "/parc" serves as a CCN routable prefix, that may be associated with one or more content producers that host or generate content for the "/parc" domain. Also, the name prefix "/parc/file" serves as a content identifier, which is common to a collection of Content Objects that are members of the "/parc/file" data collection. The name portion "c=n" serves as a name suffix, where n specifies a chunk identifier (or sequence number) for a chunk corresponding to the data collection or stream named "/parc/file." If the collection has 10 chunks, the system can generate TLVs for the 10 corresponding Interests as follows:

TABLE 3

| Type | Length | Value |
|------|--------|-------|
| Name | 14 | "/parc/file/c=1" |
| Name | 14 | "/parc/file/c=2" |
| Name | 14 | "/parc/file/c=3" |
| . . . | . . . | . . . |
| Name | 14 | "/parc/file/c=9" |
| Name | 15 | "/parc/file/c=10" |

In some embodiments, the system may generate a compression table for the TLVs listed in Table 3, and can use this compression table to compress the TLVs. A simple compression algorithm may compress each individual TLV, and my do so using the complete data within each TLV field. However, such a simple compression technique may not be capable of compressing TLVs for several related Interests using the same compression table, when there are subtle variations in the Interests' TLVs. For example, a trailing portion of the TLV's "value" field can vary based on the sequence number in the Interest's suffix. Also, the TLV's "length" field can vary depending on the length of the Interest's suffix.

In some embodiments, the computer can generate a compression table based on the individual components within the TLV (e.g., a CCN name). For example, the computer can generate the following compression table for the TLVs in Table 3:

TABLE 4

| Data | Code |
|---|---|
| "Name" | 1 |
| "parc" | 2 |
| "/file" | 3 |
| "/c=" | 4 |
| 2, 3 | 5 |
| 5, 4 | 6 |
| 1, 6 | 7 |

In Table 4, the name prefix "/parc/file/c=" is compressed into a binary encoding represented by the code 4, and the TLV for this name prefix is encoded into a binary encoding represented by the code: 7.

In some embodiments, the compression table can use a variable-length binary code, as illustrated in Table 5. The name prefix "/parc/file/c=" can be compressed into a variable-length binary code "011," and the TLV for this name prefix can be encoded into a variable-length binary code "0111."

TABLE 5

| Data | Variable-length Code |
|---|---|
| "Name" | 1 |
| "parc" | 01 |
| "/file" | 001 |
| "/c=" | 011 |
| 01, 001 | 0001 |
| 0001, 011 | 0011 |
| 1, 0011 | 0111 |

Moreover, the compression module may ignore the "length" field of the TLV, or may replace the "length" field with a predetermined value, to generate smaller compression dictionaries and smaller compressed TLVs. This is possible because a TLV decompressor can derive the length from the TLV's "value" field after decompressing the "type" and "value" fields.

In some embodiments, the TLV compressor can generate a TLV that references elements of a compressed TLV. For example, given that the TLV for the name prefix "/parc/file/c=" is represented in the compression table using the code 7, the system can encode a TLV for the name "/parc/file/c=10" using the tuple:

TABLE 6

| Encoded Value | Appended Value |
|---|---|
| 7 | "10" |

A computer can decompress the TLV of Table 6 by first decoding the TLV represented by the coded value 7, appending the character sequence "10" to the "value" field of the decompressed TLV, and then recomputing the "length" field. This operation is illustrated in Table 7, where $T_7$ represents the decompressed "type" field, $L_7$ represents the decompressed "length" field, and $V_7$ represents the decompressed "value" field:

TABLE 7

| Type | Length | Value |
|---|---|---|
| $T_7$ | $L_7 + 2$ | $V_7$, "10" |

The system can first decompress the "type" and "value" fields for TLV represented by the code 7 (or variable-length code "0001"), and computes the "length" of the decompressed "value" field. The system can then use the decompressed "value" field for $TLV_7$ and the "appended value" data in the tuple of Table 6 to decode the original "value" field "/parc/file/c=10". The system can also recompute the "length" field of $TLV_7$ based on the decompressed "value" field, and adds the length of the "appended value" field (e.g., a length of 2) to derive the length 15 of the original "length" field.

This solution helps compress TLVs by recognizing that certain portions of the TLVs may change frequently between packets, while other portions of the TLVs may have values in common. This TLV compression technique can build a compression table based on the TLV patterns that are common between different TLVs from a given CCN domain or for a given data collection, and leaves the remaining portions out of the compression table. This can result in a compact compression table that can leverage the CCN name portions found throughout multiple different TLVs, without having to create TLV entries in the compression table for specific Content Objects. Having a compact TLV compression table makes it easier to transfer and synchronize the compression table between different computers across CCN.

Figure 4:
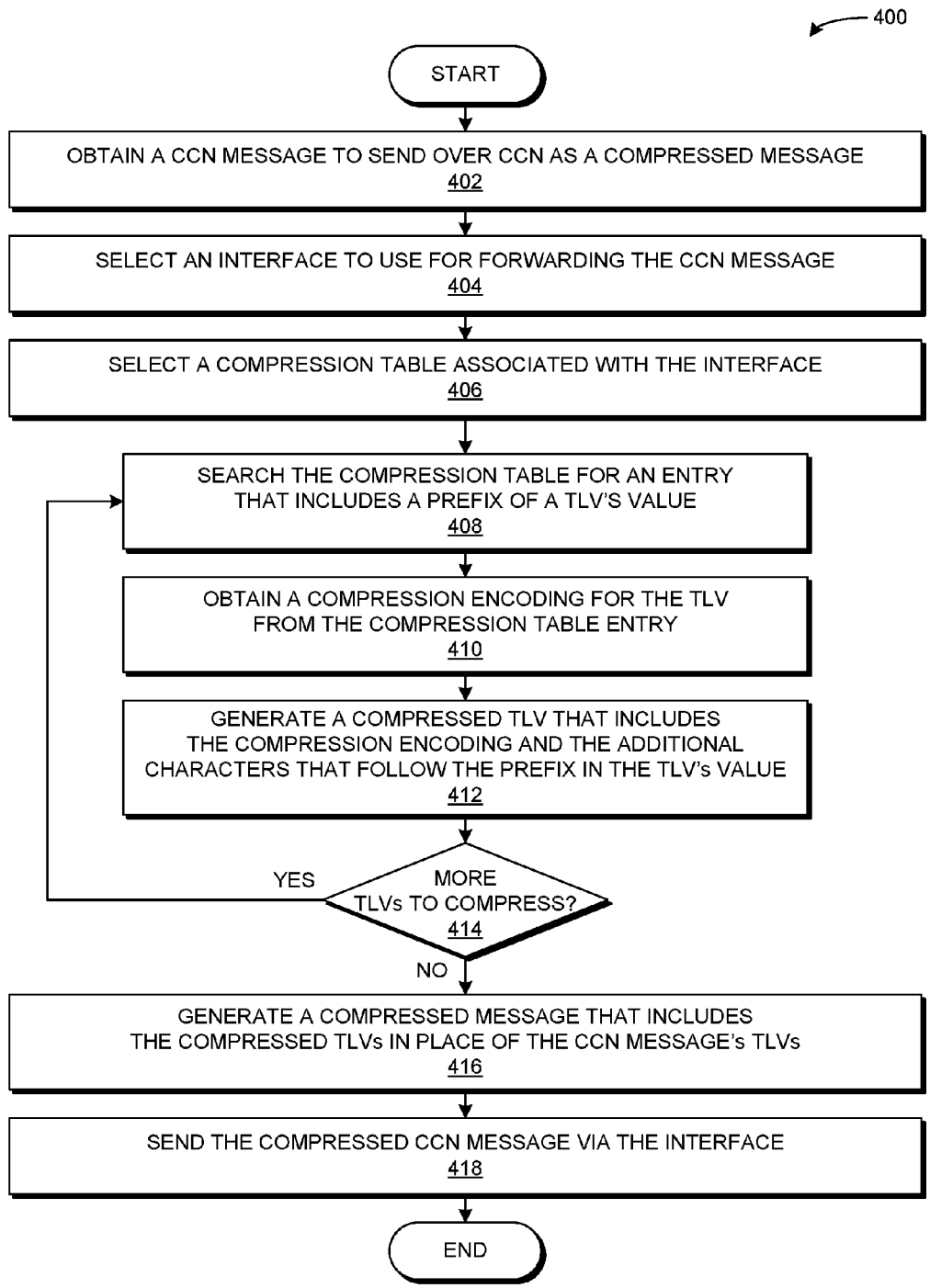
FIG. 4 presents a flow chart illustrating a method for compressing TLVs in a CCN message in accordance with an embodiment.

FIG. 4 presents a flow chart illustrating a method 400 for compressing TLVs in a CCN message in accordance with an embodiment. Specifically, a computer or switch (both referred to as a computer herein) can obtain a CCN message to send over a CCN as a compressed message (operation 402). Recall that in some embodiments, the compression tables are negotiated between neighbors of a network topology. Hence, the computer can select an interface to use for forwarding the CCN message (operation 404), and selects a compression table associated with the interface (operation 406). In some embodiments, the computer can select the interface by performing a longest-prefix matching lookup operation on a Forwarding Information Base (FIB) if the message is a CCN Interest, or on a Pending Interest Table (PIT) if the message is a CCN Content Object.

The computer then selects a TLV to compress from the CCN message, and searches the compression table for an entry that includes a prefix of the TLV's value (operation 408). If an entry exists, the computer obtains a compression encoding for the TLV from the compression table entry (operation 410), and generates a compressed TLV that includes the compression encoding and the additional characters that follow the prefix in the TLV's value (operation 412).

In some embodiments, if the compression table does not include at least a prefix of the TLV's value, the computer can add an entry that includes the prefix and an encoding for the prefix. However, because the compression table needs to be synchronized with the neighbor, the computer may not use this new code for the prefix until the table has been synchronized with the neighbor.

The computer may then generate a compressed TLV that includes the compression encoding and the additional characters that follow the prefix in the TLV's value (operation 412). If the CCN message includes more TLVs to compress (operation 414), the computer returns to operation 408 to search the compression table. Otherwise, the computer can generate a compressed message that includes the compressed TLVs in place of the CCN message's TLVs (operation 416), and can proceed to send the compressed CCN message via the interface (operation 418).

Figure 5:
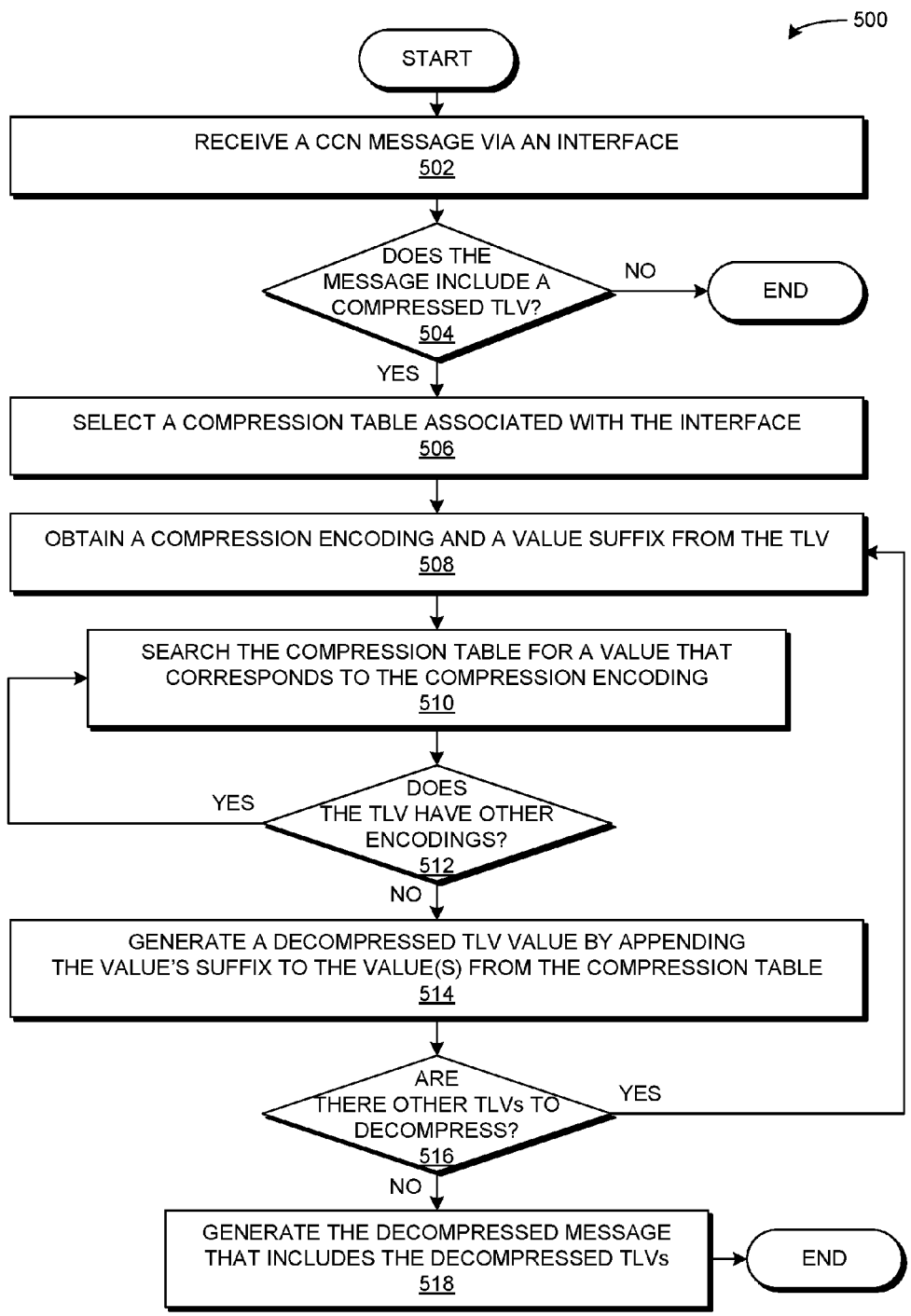
FIG. 5 presents a flow chart illustrating a method for decompressing TLVs in a CCN message in accordance with an embodiment.

FIG. 5 presents a flow chart illustrating a method for decompressing TLVs in a CCN message in accordance with an embodiment. When the computer receives a CCN message via an interface (operation 502), the computer can determine whether the message includes a compressed TLV (operation 504). If a compressed TLV doesn't exist, the computer may not need to decompress the CCN message.

Otherwise, the computer can select a compression table associated with the interface (operation 506), and obtains a compression encoding and a values suffix from the compressed TLV (operation 508). The computer can then search the compression table for a value that corresponds to the compression encoding (operation 510).

If the computer determines that the TLV or the decompressed value has other encodings (operation 512), the computer can return to operation 510 to search the compression table. Otherwise, the computer can generate a decompressed TLV by appending the compressed TLV's suffix to the decompressed values from the compression table (operation 514).

The computer may then determine whether there are other compressed TLVs in the CCN message (operation 516), and if so, the computer can return to operation 508 to decompress the TLV. Otherwise, the computer can generate an decompressed CCN message that includes the decompressed TLVs (operation 518), and proceeds to process the decompressed CCN message as usual.

Compressing CCN Message Data and TLVs

In some embodiments, a computer can use a compression table to compress any data in a CCN message, including data not represented by a TLV. For example, the computer can compress segments of data into a predetermined data structure that specifies whether the data is a TLV or other data. Another computer that decompresses the block can determine, from the block, whether the compressed data is a TLV. Recall that a computer that compresses a TLV does not need to store the value's length in the compressed TLV. If the compressed data is a TLV, the computer can compute a length of the decompressed data's value, and uses the compressed data to generate the corresponding TLV.

Figure 6:
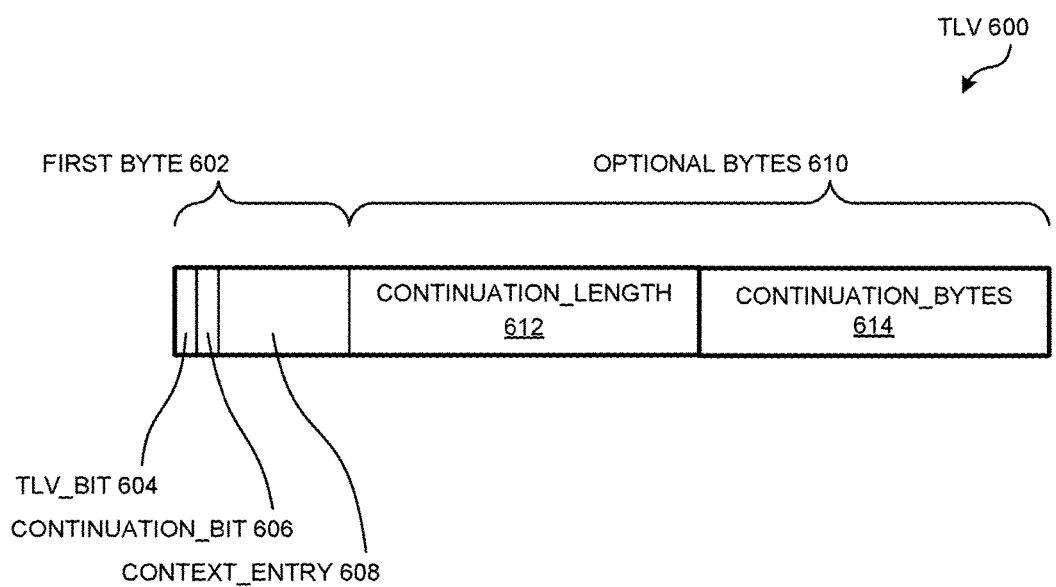
FIG. 6 illustrates a structure of a compressed block that facilitates compressing TLVs and non-TLV data in a CCN message in accordance with an embodiment.

FIG. 6 illustrates a structure of a compressed block 600 that facilitates compressing TLVs and non-TLV data in a CCN message in accordance with an embodiment. Compressed block 600 can include a first byte 602, and can include one or more optional bytes 610 that may follow first byte 602. Specifically, first byte 602 can include a TLV_BIT field 604 that indicates whether compressed block 600 encodes a TLV (e.g., if TLV_BIT is set to '1'), or encodes other data (e.g., if TLV_BIT is set to '0'). Compressed block 600 can also include a CONTINUATION_BIT 606 that, when set (e.g., set to '1'), indicates that optional bytes 610 follow compressed block 600. First byte 602 can also include a CONTEXT_ENTRY field 608 that can specify a code that corresponds to a data pattern. A compression table maps the code to the data pattern.

Optional bytes 610 can include a CONTINUATION_BYTES field 614 that specifies additional data to append after the decrypted data pattern. Optional bytes 610 may also include a CONTINUATION_LENGTH field 612, which specifies a size (e.g., a number of bytes) of the data in CONTINUATION_BYTES 614.

In some embodiments, a computer that needs to decompress block 600 can use TLV_BIT 604 to determine when the data extracted from compressed block 600 needs to be represented by a TLV. The computer can also use CONTINUATION_BIT 606 to determine how to extend the data in CONTEXT_ENTRY 608, such as to extend a CCN name prefix represented by CONTEXT_ENTRY 608 to form the full CCN name that goes into the "value" field of the TLV.

Figure 7A:
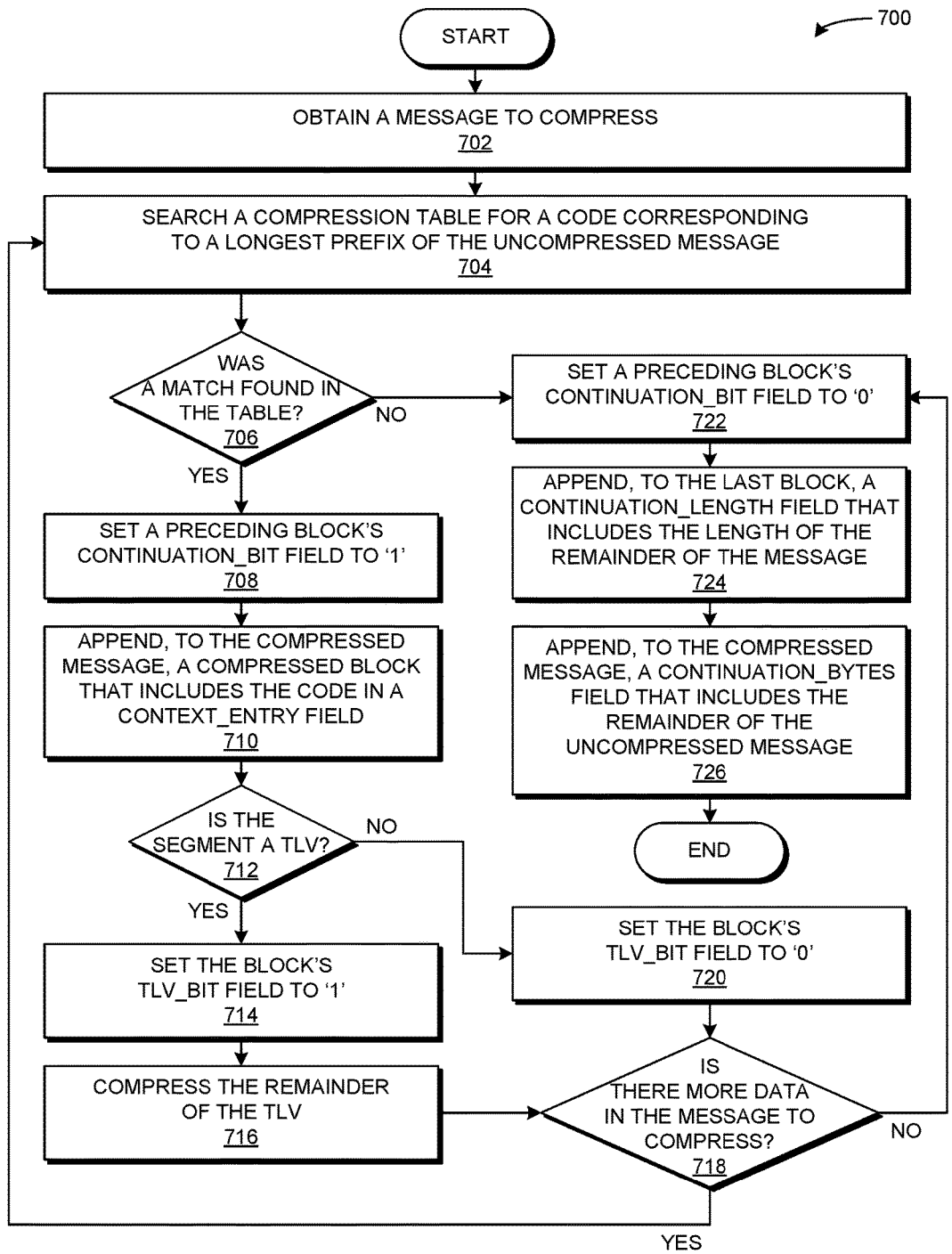
FIG. 7A presents a flow chart illustrating a method for compressing TLVs and non-TLV data in a CCN message in accordance with an embodiment.

FIG. 7A presents a flow chart illustrating a method for compressing TLVs and non-TLV data in a CCN message in accordance with an embodiment. During operation, the computer can obtain a message to compress (operation 702), and can search a compression table for a code corresponding to a longest prefix of the uncompressed message (operation 704).

If a match is found (operation 706), the computer can proceed to append a compressed block that includes the code to a compressed message, in place of the matching prefix. For example, if the new compressed block is the first block, the computer generates a new compressed message that includes the compressed block. Otherwise, if the compressed block is to extend a compressed message (e.g., a preceding compressed block exists), the computer can set the preceding block's CONTINUATION_BIT field to '1' (operation 708). The computer also generates the new compressed block so that it includes the code in a CONTEXT_ENTRY field, and appends the new compressed block to the compressed message (operation 710).

If the segment currently being compressed is a TLV (operation 712), the computer sets the block's TLV_BIT field to '1' (operation 714), and compresses the remainder of the TLV (operation 716). Otherwise, the computer sets the block's TLV_BIT field to '0' (operation 720). The computer then determines if there's more data that needs to be compressed in the CCN message (operation 718). If so, the computer can return to operation 704 to search for additional compression table entries that can be used to compress segments of the CCN message.

If the search in the compression table does not result in a match (e.g., during operation 704), or if there is no more data in the message to compress (operation 718), the computer can proceed to set a preceding block's CONTINUATION_BIT field to '0' (e.g., the last block in the compressed CCN message) (operation 722). If there is additional uncompressed data to append to the CCN message (e.g., data for which the compression-table lookup in operation 704 did not provide a code), the computer can append, to the last block of the compressed CCN message, a CONTINUATION_LENGTH field that includes the length of the remainder of the original CCN message (operation 724). The computer also appends, to the compressed CCN message, a CONTINUATION_BYTES field that includes the remainder of the uncompressed message (operation 726).

Recall that TLV messages may include some data that is common across TLVs (e.g., a CCN name prefix), and can include additional data that can vary across TLVs. The computer can compress a TLV by performing additional lookup operations on the compression table to compress the TLV message up to the end of the TLV message, such as during operation 716. The additional blocks generated by operation 716 extend the first block generated for the TLV by operations 710-714.

Figure 7B:
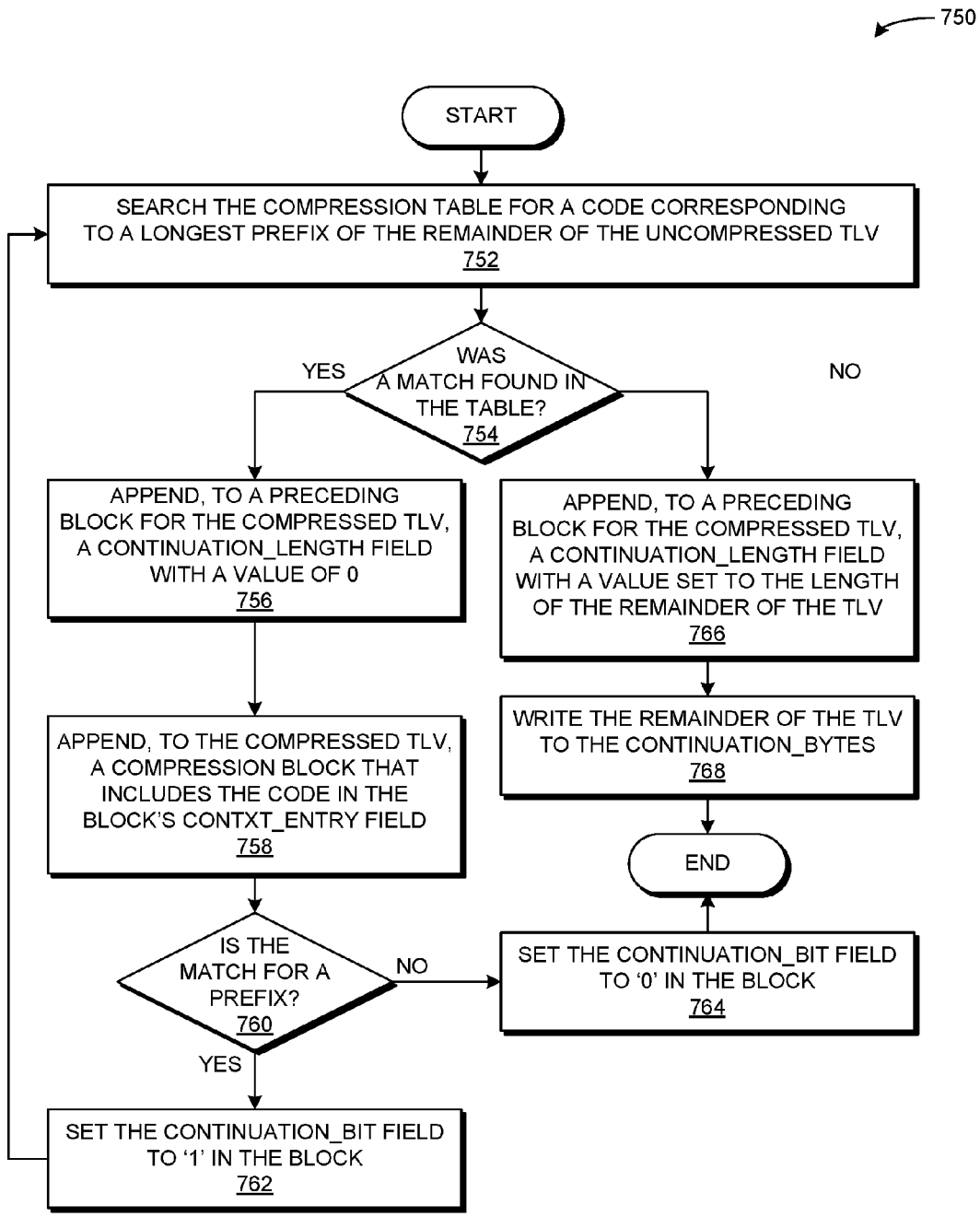
FIG. 7B presents a flow chart illustrating a method for generating a compressed block for a TLV in a CCN message in accordance with an embodiment.

FIG. 7B presents a flow chart illustrating a method for generating a compressed block for a TLV in a CCN message in accordance with an embodiment. During operation, the computer can search the compression table for a code corresponding to a longest prefix of the remainder of the compressed TLV (operation 752). If a match was found in the compression table (operation 754), the computer can append, to a preceding block for the compressed TLV, a CONTINUATION_LENGTH field with a value of 0 (zero) (operation 756). The computer also appends, to the compressed TLV, a compressed block that includes a CONTEXT_ENTRY field with the code from the compression table (operation 758).

If the match found during operation 752 is for a prefix of the remaining TLV data (e.g., if the prefix does not each the end of the TLV), the computer can set the block's CONTINUATION_BIT field to '1' (operation 762), and returns to operation 752 to search for additional codes that can extend the compressed TLV. However, if the match found during operation 752 completes the TLV, the computer can set the CONTINUATION_BIT field to '0' in the block (operation 764).

In some embodiments, if the search for a longest prefix in the compression table does not return a matching code (operation 754), the computer can append the remaining data of the TLV to the end of the compressed TLV. For example, the computer can append, to a block at the end of the compressed TLV, a CONTINUATION_LENGTH field with a value set to the length of the remaining TLV data (operation 766). The computer then appends, to the compressed TLV, a CONTINUATION_BYTES field that includes the remainder of the uncompressed TLV (operation 768).

Figure 8A:
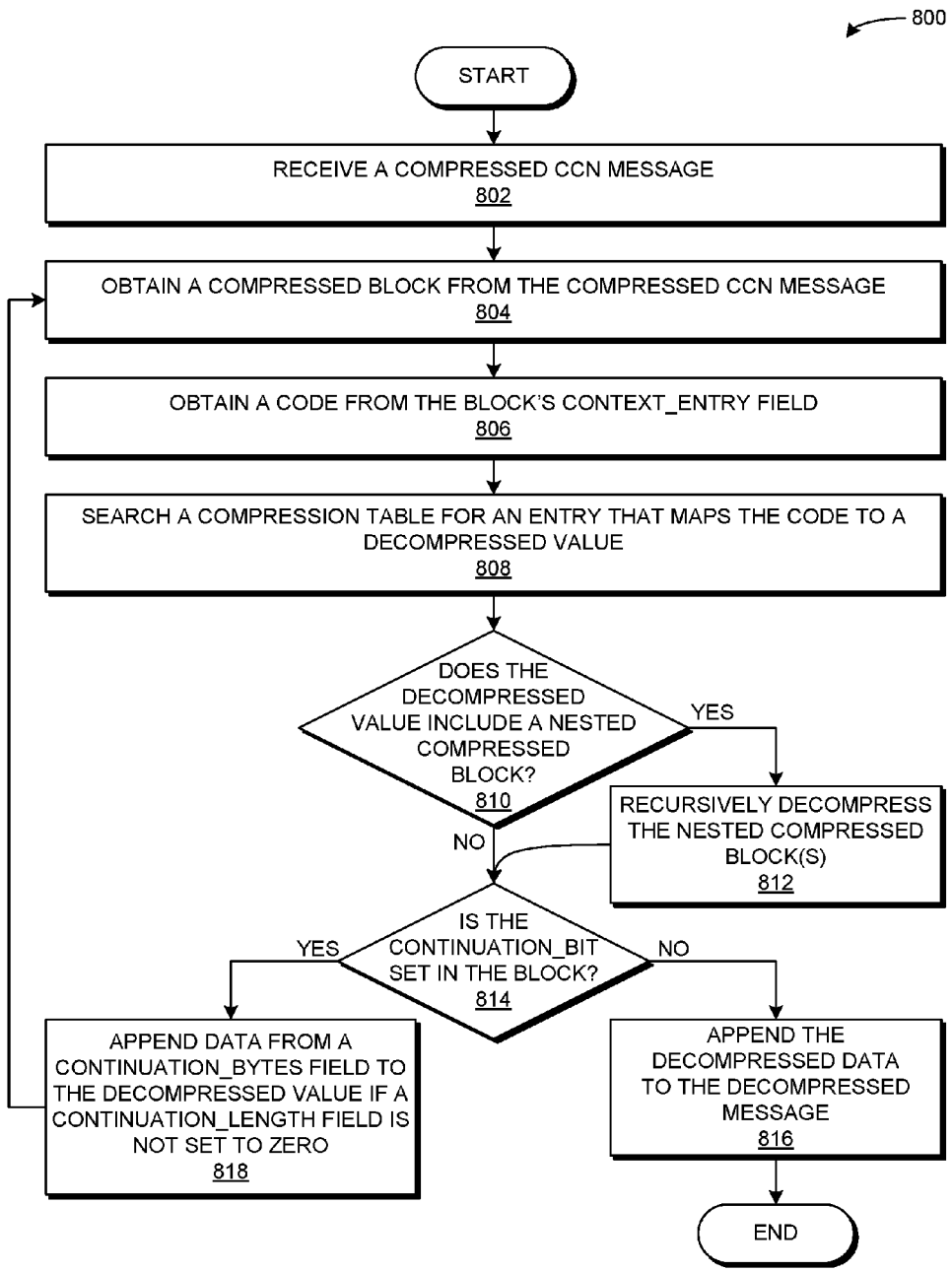
FIG. 8A presents a flow chart illustrating a method for decompressing TLVs and non-TLV data in a CCN message in accordance with an embodiment.

FIG. 8A presents a flow chart illustrating a method for decompressing TLVs and non-TLV data in a CCN message in accordance with an embodiment. During operation, a computer can receive a compressed CCN message (operation 802), and obtains a compressed block from the CCN message (operation 804). The computer then obtains a code from the block's CONTEXT_ENTRY field (operation 806), and searches a compression table for an entry that maps the code to a decompressed value (operation 808).

The computer then determines if the decompressed value includes a nested compressed block (operation 810). If so, the computer can recursively decompress the nested compressed block(s) (operation 812). Otherwise, the computer skips the recursive decompression step and proceeds to determine if the block's CONTINUATION_BIT is set (operation 814). If the CONTINUATION_BIT is not set, the computer appends the decompressed data to the decompressed CCN message (operation 816), and returns the decompressed CCN message.

Otherwise, if the CONTINUATION_BIT is set, the system proceeds to decompress additional data from the compressed CCN message. For example, if the CONTINUATION_LENGTH field in the message has a non-zero value, the computer can append data from a CONTINUATION_BYTES field that follows the CONTINUATION_LENGTH field (whose size is specified in the CONTINUATION_LENGTH field) (operation 818). The computer then returns to operation 804 to obtain and decompress another block from the CCN message.

Figure 8B:
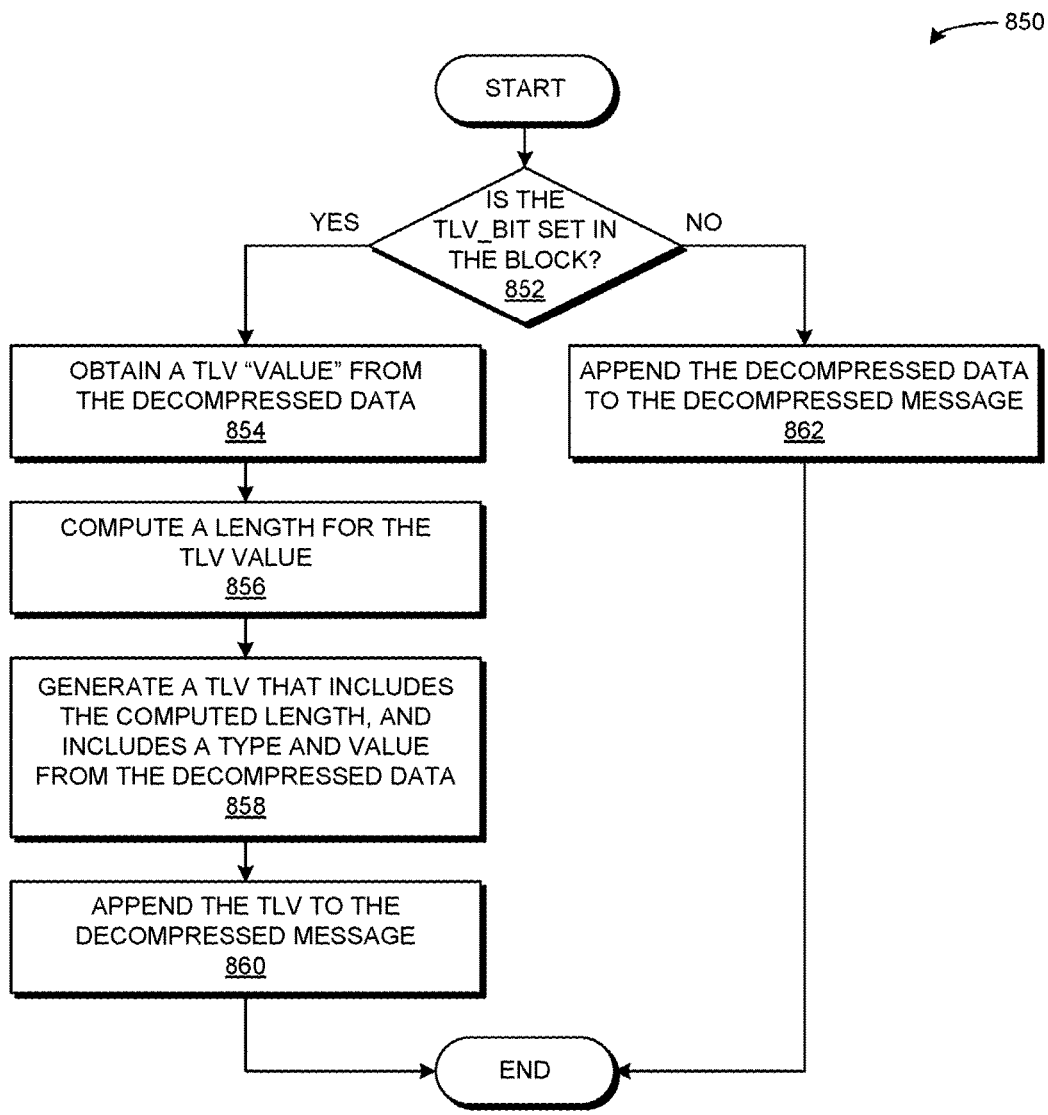
FIG. 8B presents a flow chart illustrating a method for decompressing a TLV compressed block in accordance with an embodiment.

FIG. 8B presents a flow chart illustrating a method for decompressing a TLV compressed block in accordance with an embodiment. During operation, the computer determines whether the TLV_BIT is set in the block (operation 852). If the TLV_BIT is not set in the block (operation 852), the computer appends the decompressed data to the decompressed message (operation 862).

On the other hand, if the TLV_BIT is set, the computer can obtain a TLV "value" from the decompressed data (operation 854), and computes a length for the TLV value (operation 856). The computer can generate a TLV that specifies the comped length in a "length" field, and includes the "type" and "value" from the decompressed data in the TLV's "type" and "length" fields, respectively (operation 858). The computer may then append the TLV to the decompressed message (operation 860).

Figure 9:
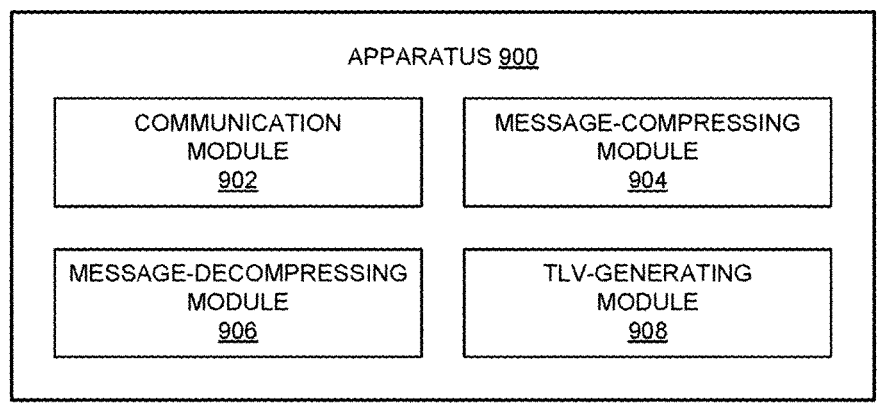
FIG. 9 illustrates an exemplary apparatus that facilitates compressing or decompressing TLVs in a message in accordance with an embodiment.

FIG. 9 illustrates an exemplary apparatus 900 that facilitates compressing or decompressing TLVs in a message in accordance with an embodiment. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a communication module 902, a message-compressing module 904, a message-decompressing module 906, and a TLV-generating module 908.

In some embodiments, communication module 902 can send and/or receive compressed messages over a computer network (e.g., CCN), and can synchronize compression tables with neighboring network nodes. Message-compressing module 904 can compress a message and/or TLVs inside a message, and message-decompressing module 906 can decompress a message and/or a TLV inside a message. TLV-generating module 908 can recreate a TLV from a compressed TLV by computing a length of a decompressed component corresponding to the TLV's value. Message-decompressing module 906 can replace the compressed TLV in the message with the recreated TLV.

Figure 10:
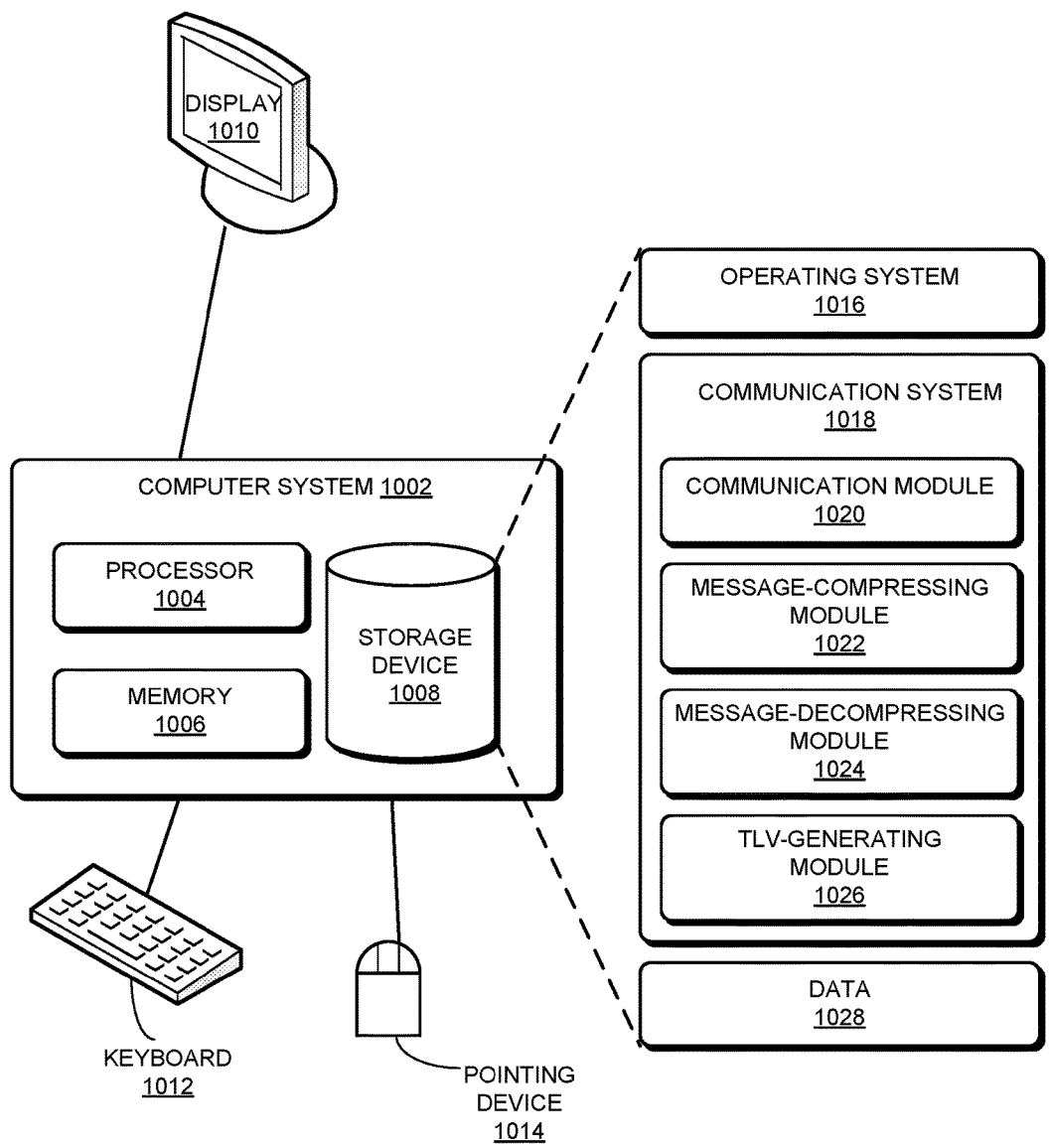
FIG. 10 illustrates an exemplary computer system that facilitates compressing or decompressing TLVs in a message in accordance with an embodiment.

FIG. 10 illustrates an exemplary computer system 1002 that facilitates compressing or decompressing TLVs in a message in accordance with an embodiment. Computer system 1002 includes a processor 1004, a memory 1006, and a storage device 1008. Memory 1006 can include a volatile memory (e.g., RAM) that serves as a managed memory, and can be used to store one or more memory pools. Furthermore, computer system 1002 can be coupled to a display device 1010, a keyboard 1012, and a pointing device 1014. Storage device 1008 can store operating system 1016, communication system 1018, and data 1026.

Communication system 1018 can include instructions, which when executed by computer system 1002, can cause computer system 1002 to perform methods and/or processes described in this disclosure. Specifically, communication system 1018 may include instructions for sending and/or receiving compressed messages over a computer network (e.g., CCN), and for synchronizing compression tables with neighboring network nodes (communication module 1020).

Further, communication system 1018 can include instructions for compressing a message and/or TLVs inside a message (message-compressing module 1022), and can also include instructions for decompressing a message and/or TLVs inside a message (message-decompressing module 1024). Communication system 1018 can also include instructions for recreating a TLV from a compressed TLV by computing a length of a decompressed component corresponding to the TLV's value, and replacing the compressed TLV in the message with the recreated TLV (TLV-generating module 1026).

Data 1026 can include any data that is required as input or that is generated as output by the methods and/or processes described in this disclosure. Specifically, data 1026 can store at least a set of compression tables associated with one or more virtual or physical interfaces, and a set of compressed and/or decompressed messages.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   selecting, by a computer and from a message, a type-length-value (TLV) component to compress;
   searching a compression table for an entry that includes a prefix of the TLV component's value;
   obtaining a compression encoding for the TLV value from the compression table entry;
   generating a compressed block that corresponds to a compressed version of the TLV component, wherein the compressed block includes the compression encoding in place of the prefix in the TLV component's value; and
   generating a compressed message that includes the compressed block in place of the TLV component.

2. The method of claim 1, further comprising:
   determining an interface for forwarding the message, based on the message's name; and
   selecting the compression table that corresponds to the interface.

3. The method of claim 2, further comprising:
   in response to generating the compressed message, forwarding the compressed message via the interface.

4. The method of claim 1, wherein generating the compressed block involves:
   determining that the compression encoding corresponds to a subset of the TLV's value; and
   setting a continuation field of the compressed block, wherein the continuation field indicates that additional data follows the compressed block.

5. The method of claim 4, wherein generating the compressed block further involves:
   in response to determining that a suffix of the TLV component's value does not have a matching entry in the compression table:
   determining a size of the suffix;
   appending, to the end of the compressed block, a size field that includes the suffix's size; and
   appending the suffix to the size field.

6. The method of claim 4, wherein generating the compressed block further involves:
   in response to determining that a sequence of characters following the TLV component's value have a matching entry in the compression table:
   appending, to the compressed block, a size field with a zero value; and
   appending, to the size field, one or more additional compressed blocks that compress a remaining portion of the TLV component's value.

7. A non-transitory computer-readable storage medium storing instructions that when executed by a computer cause the computer to perform a method, the method comprising:
   selecting, from a message, a type-length-value (TLV) component to compress;
   searching a compression table for an entry that includes a prefix of the TLV component's value;
   obtaining a compression encoding for the TLV value from the compression table entry;
   generating a compressed block that corresponds to a compressed version of the TLV component, wherein the compressed block includes the compression encoding in place of the prefix in the TLV component's value; and
   generating a compressed message that includes the compressed block in place of the TLV component.

8. The non-transitory computer-readable storage medium of claim 7, further comprising:
   determining an interface for forwarding the message, based on the message's name; and
   selecting the compression table that corresponds to the interface.

9. The non-transitory computer-readable storage medium of claim 8, further comprising:
   in response to generating the compressed message, forwarding the compressed message via the interface.

10. The non-transitory computer-readable storage medium of claim 7, wherein generating the compressed block involves:
    determining that the compression encoding corresponds to a subset of the TLV's value; and
    setting a continuation field of the compressed block, wherein the continuation field indicates that additional data follows the compressed block.

11. The non-transitory computer-readable storage medium of claim 10, wherein generating the compressed block further involves:
    in response to determining that a suffix of the TLV component's value does not have a matching entry in the compression table:
    determining a size of the suffix;
    appending, to the end of the compressed block, a size field that includes the suffix's size; and
    appending the suffix to the size field.

12. The non-transitory computer-readable storage medium of claim 10, wherein generating the compressed block further involves:
    in response to determining that a sequence of characters following the TLV component's value have a matching entry in the compression table:
    appending, to the compressed block, a size field with a zero value; and
    appending, to the size field, one or more additional compressed blocks that compress a remaining portion of the TLV component's value.

13. A method, comprising:
    receiving, by a computing device via a network interface, a compressed message;
    selecting a compression table associated with the interface;
    decompressing a message portion from a respective compressed block of the compressed message, using the compression table;
    in response to determining that the respective compressed block corresponds to a TLV component:
    computing a length of the message portion; and
    recreating the TLV component using the message portion and the computed length; and
    generating a decompressed message, which includes the TLV component in place of the compressed block.

14. The method of claim 13, further comprising:
    synchronizing entries of the compression table with a computer node accessible via the interface.

15. The method of claim 13, wherein decompressing the message portion from the respective compressed block involves:
    detecting that a continuation field of the compressed block indicates that additional data follows the compressed block; and
    reading a size field following the compressed block in the compressed message.

16. The method of claim 15, wherein decompressing the message portion from the respective compressed block further involves:
    in response to determining that the size field includes a non-zero value:
    reading a number of bytes that follow the compressed block, corresponding to the size to obtain a data suffix; and
    appending the data suffix to the message portion.

17. The method of claim 15, wherein decompressing the message portion from the respective compressed block further involves:
    in response to determining that the size field includes a zero value:
    decompressing a second compressed block that follows the respective compressed block in the compressed message, to obtain a second message portion; and
    appending the second message portion to the message portion.

18. The method of claim 13, wherein decompressing the message portion from the respective compressed block involves:
    detecting that a continuation field of the compressed block indicates that additional data does not follow the compressed block; and
    appending the decompressed message portion to the decompressed message.

\* \* \* \* \*